Figure 5:
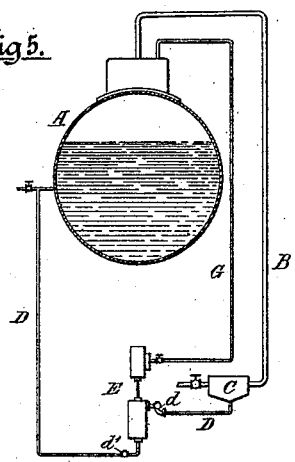

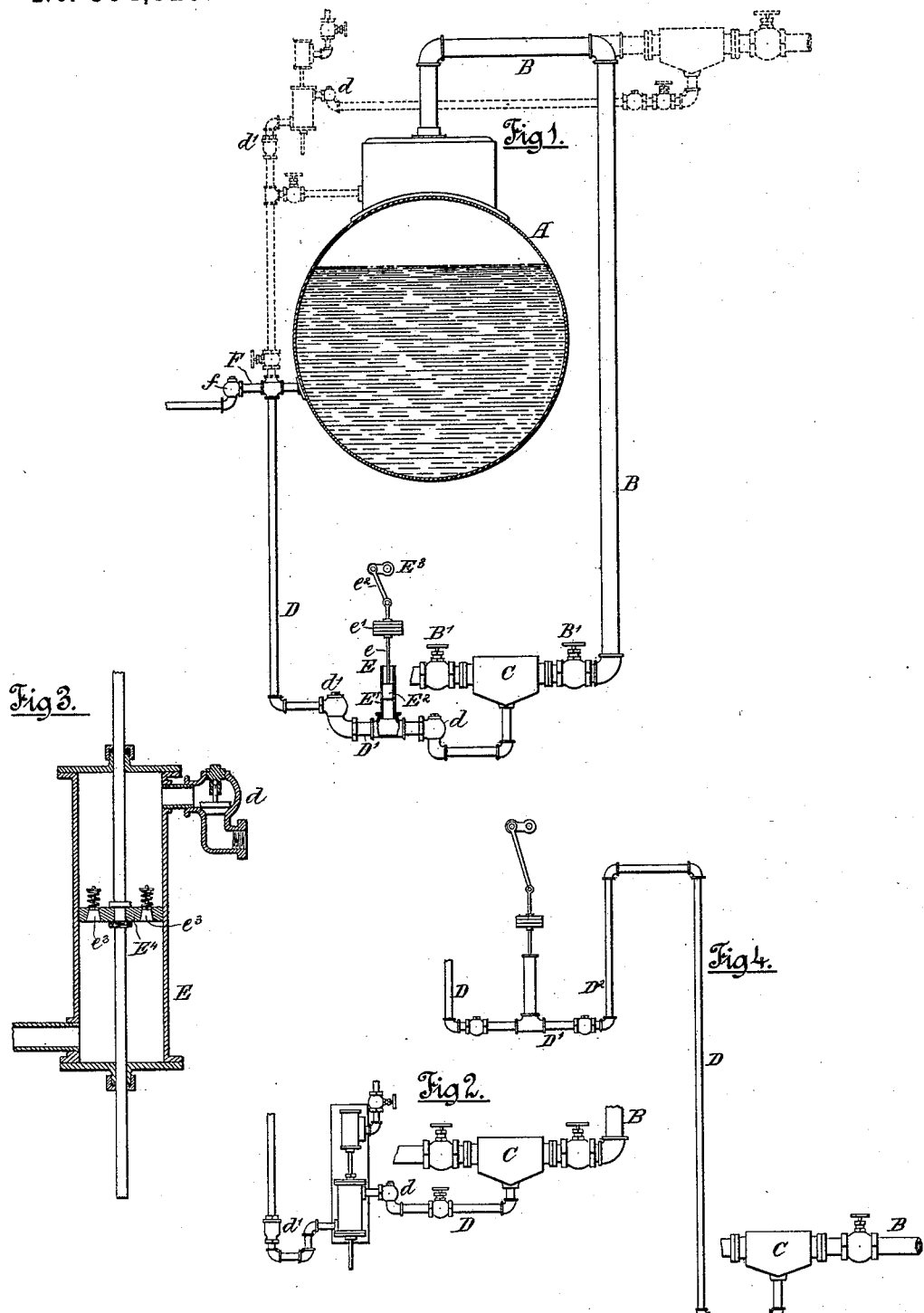

(No Model.)  2 Sheets—Sheet 2.

W. BURNHAM.
WATER RETURNING SYSTEM FOR GENERATORS.

No. 394,829. Patented Dec. 18, 1888.

Witnesses.
Wm. J. Henning
Louis M. F. Whitehead

Inventor.
Walter Burnham.
by Dayton Poole W Brown
Attorneys.

UNITED STATES PATENT OFFICE.

WALTER BURNHAM, OF CHICAGO, ILLINOIS.

WATER-RETURNING SYSTEM FOR GENERATORS.

SPECIFICATION forming part of Letters Patent No. 394,829, dated December 18, 1888.

Application filed February 21, 1888. Serial No. 264,813. (No model.)

*To all whom it may concern:*

Be it known that I, WALTER BURNHAM, of Chicago, in the county of Cook and State of Illinois, have invented certain new and useful Improvements in Water-Returning Systems for Steam-Generators; and I do hereby declare that the following is a full, clear, and exact description thereof, reference being had to the accompanying drawings, and to the letters of reference marked thereon, which form a part of this specification.

This invention relates to a steam system composed of a steam-generator, a steam-supply pipe leading from the generator to an engine or other steam-using device, and a return-pipe connecting the steam-pipe with the generator.

The primary objects of this invention are the production and maintenance in the circuit composed of the generator, steam-pipe, and return-pipe, and by means of a pump connected in the return-pipe of a flow of steam from the generator through the steam-pipe, a flow of steam and water from the steam-pipe into the return-pipe, and a movement of water or water and steam from the return-pipe into the generator, the movement of water into the generator being effected by only such expenditure of power as is necessary to overcome friction, the water-head, if any, and the difference in pressure between the generator and the steam-space in the return-pipe adjacent to the pump.

To these and other ends which are had in view the invention consists in the matters hereinafter set forth, and pointed out in the appended claims.

In the drawings, Figure 1 shows in full lines a diagrammatic view of a steam-circuit comprising a generator, a steam-supply pipe leading to a point below the water-level of the generator, a separator connected with a low point of the steam-pipe, a return-pipe so connected with the separator as to take both steam and water therefrom and terminating in the generator, and a pump connected in said return-pipe. Fig. 2 is a side elevation of another form of pumping device connected in the return-pipe of the circuit. Fig. 3 is a central vertical section of the pump-cylinder of Fig. 2. The remaining figures are diagrams of various arrangements of my invention.

A represents a steam-generator; B, a steam-supply pipe leading from the generator to an engine or other steam-using device, (not shown,) said pipe B being provided with a stop-valve, B', on its way to such engine or other steam-using device; C, a "separator" connected in the steam-pipe for the purpose of separating the water from the steam therein; D, a return-pipe, so connected with the separator as to take both steam and water therefrom and terminating in the generator; and E, a pump connected in the return-pipe D.

In the particular construction shown in full lines of Fig. 1 the pumping mechanism comprises a section of pipe, D', forming part of the return-pipe D, and provided with check-valves $d\ d'$, which open toward the generator. Between these check-valves is connected to the pipe D' a vertical cylinder, E', open to the atmosphere at the top and containing a piston, $E^2$, the rod $e$ of which carries a weight, $e'$, equal to the pressure in the return-pipe derived from the steam-pipe through the separator.

$E^3$ represents a crank operated by any suitable means and connected by a pitman, $e^2$, to the stem $e'$ of the piston $E^2$.

F is a water-feed pipe with which the return-pipe D in this instance is shown to connect, it being understood, however, that the return may directly enter the generator either above or below the water-level therein. When the return-pipe is connected with the feed-pipe F, the latter should generally have a check-valve, $f$, outside the return-pipe connection therewith for alternative use of the two pipes for the supplying of water to the generator.

The separator illustrated in side view represents that form of device described in detail in the application of William Irving, of Chicago, Serial No. 263,224, filed February 7, 1888, and which contains a series of deflecting-plates, against which the steam impinges, and by which water is taken from the steam. The return-pipe D has connection with the bottom of the separator and takes both steam and water in a proper operation of the return-pipe, as contemplated by Irving, and as provided by the invention herein set forth.

Describing the operation of the construction above set forth and supposing the crank E³ to be raised and at rest, it is manifest that the portion of the return-pipe between the check-valve d' and the generator will be subject to generator-pressure, plus the pressure of the water column present in said portion of the return-pipe when the latter ascends, while that part of the return-pipe at the opposite side of the same valve, d', is subject to the less pressure derived from the steam-pipe, diminished by whatever of condensation takes place in such portion of the return-pipe. If now the crank E³ be revolved toward its lowest position, it is plain that the weight e' will aid the force applied to the crank E³ in depressing the piston E² and in forcing the contents of the pipe D' past the check-valve d', wherefore, by making the weight e' to balance the steam-pressure in the pipe D', the power exerted in revolving the crank will in lifting the piston be no greater than is necessary to overcome the friction of the parts, and in depressing the piston will be no greater than is necessary to meet the excess of pressure at the left of valve d' over that at the right of it, plus the friction of the pump and of the water moved. In other words, suppose the steam-pressure in the generator to be one hundred pounds, the water-head in the return-pipe five pounds, the steam-pressure in the return-pipe derived from the steam-pipe ninety-five pounds, and the pressure due to the weight e' ninety-five pounds. The pump will require for its operation, first, in lifting the piston only the extraneous force needful to overcome friction of its parts, because the steam-pressure in D' balances the pressure of the weight, and, second, in the depression of the piston only the force needful to overcome a resistance of ten pounds, (plus the friction of the pump and of the water being raised,) because the weight e' balances ninety-five of the one hundred and five pounds specified, against which the piston descends. More uniform exertion of power upon the pump will be obtained with the same result by making the weight e', say, one hundred pounds instead of in exact balance of the ninety-five pounds in the steam end of the return. By thus utilizing the steam-pressure in the steam-space of the return-pipe to force water against generator-pressure the return to the generator of the water condensed in and entrained into the steam-pipe and abstracted therefrom by a separator is accomplished with the least possible cost in power, while, obviously, the water is returned with the utmost promptness and with the least practicable loss of temperature.

In Figs. 2 and 3 another simple form of single-acting pump is illustrated, which, while differing in construction and operation from that shown in Fig. 1 and above described, similarly utilizes the pressure in the steam end of the return-pipe in aid of forcing water into the generator. In this pump, as better seen in Fig. 3, the piston E⁴ has a check-valve, e³, which opens toward the generator, and the pump is located between the two check-valves d d', as in the case of Fig. 1. In the left or back stroke of the piston the valve e³ gives passage to the water or water and steam, while on the opposite or forcing stroke the steam-pressure behind the piston bears thereon in aid of the extraneous power applied through the piston-stem.

One of the advantages of a return-pipe leading from a steam-pipe or from a separator connected with a steam-pipe, and taking both steam and water therefrom, is the increase in steam-flow through the steam-pipe, whereby that portion of the steam which goes to the engine is delivered at a higher temperature, and is therefore more effective for work. The amount of steam taken from the steam-pipe into the return-pipe, or the activity of steam-flow through the latter, will depend upon the degree of difference in pressure between the steam-pipe and the low-pressure space in the return-pipe, because it is by the excess of pressure in the steam-pipe that such steam-flow is produced. In the construction herein shown, wherein a pump is connected in the return-pipe, the low-pressure space of the return-pipe is at or adjacent to the pump.

It is manifest that the pump may be run at any desired speed, and that the speed of the pump will determine the reduction of pressure in the low-pressure space of the return-pipe and the rapidity of steam-flow from the steam-pipe to such low-pressure space.

In the arrangement of the return-pipe and pump shown in Figs. 1 and 2, the water of condensation and entrainment will flow from the separator by gravity. In Fig. 4 the pump, including that part of the return-pipe D' with which it is connected, is located above the separator, and to insure a movement of water with the steam passing from the separator to the intermittingly-acting pump the return-pipe leading to the pump is carried above the latter, and connected therewith through a descending leg, D³, (which may be regarded as the low-pressure chamber of the system,) to which the steam will constantly flow and into which the water carried thereby will be continuously deposited, notwithstanding the intermittent action of the pump. By this construction the lift of the water to the height of the position of the pump is performed directly by the excess of pressure in the steam-pipe over that in the low-pressure chamber, (as set forth in the application of William Irving, Serial No. 263,225, filed February 7, 1888,) and the pump is therefore relieved of this duty.

In dotted lines of Fig. 1 the separator, pump, and the return-pipe are shown wholly above the water-level of the generator, and the delivery end of the return-pipe is shown as connected either with the steam-space or the water-space of the generator. This dotted arrangement will best serve to illustrate generally the advantage of the pump in all forms of the return-pipe, for while in the absence of the pump water would in such an arrangement descend by gravity from the separator to the generator, there would be no such active movement of steam from the steam-pipe into the return-pipe as would appreciably increase the steam-flow through the steam-pipe or as would cause the steam to actively sweep water from the interior surfaces of the separator into the return-pipe. In other words, there would occur only simple drainage of the steam-pipe at the separator, which would accomplish less than perfect separation, and an entire absence of augmented steam movement, which would give hotter steam to the engine. The pump, on the other hand, when operated at a suitable speed prevents the return-pipe leading to it from filling with water and takes steam with water from the adjacent space of the return-pipe as effectively as would an escape-pipe leading to the outer air, and by thus maintaining a steam-space under lower pressure than subsists in the steam-pipe occasions an active flow of steam from the latter toward the pump. This involves a much larger flow of steam through the steam-pipe, gives a correspondingly higher temperature to the steam which passes to the engine, and with proportionate force draws the water from the surfaces of the separator, with the result of furnishing more completely dry steam to the engine. It follows in practice, as in theory, that by means of a pump connected in the return-pipe a relatively small and inexpensive separator may accomplish the work that has been heretofore less perfectly done by much larger and more costly ones, while the prompt return of water and steam from the separator to the generator reduces the cost of the advantages secured to a point far below their value.

Figure 6:
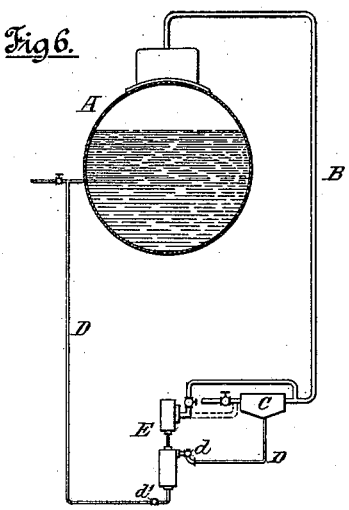
Figure 7:
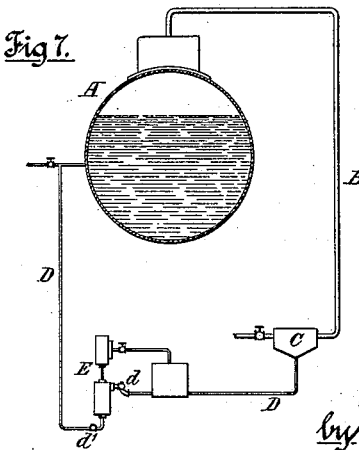

Fig. 5 shows a steam-pump connected in the return-pipe and taking steam for its operation from the generator. Fig. 6 shows the steam-cylinder of the pump connected with the steam-pipe adjacent to the separator, and Fig. 7 shows the steam-cylinder of the pump connected with the steam-space of the return-pipe. The first of these arrangements is less advantageous than either of the other two; the second contributes to the increase of steam-flow through the steam-pipe, and the third, while attaining this result of the second, also augments the force of the lateral outflow of steam through the separator and correspondingly contributes to the perfection of its action.

In applications for patent filed by William Irving, February 7, 1888, Serial Nos. 263,224 and 263,225, the connection of a separator and return-pipe with a steam-pipe is shown and described, and such combination therefore is not herein broadly claimed.

I claim as my invention—

1. The combination, with a steam-generator and a steam-pipe leading therefrom to an engine or other steam-using device, of a return-pipe so connected with the steam-pipe as to take both steam and water therefrom, and also connected with the generator, and a pump connected in the return-pipe, whereby a movement of steam and water is induced from the steam-pipe to the pump and of water or of water and steam from the pump to the generator.

2. The combination, with a steam-generator and a steam-supply pipe leading therefrom to an engine or other steam-using device, of a return-pipe so connected with the steam-pipe as to take both steam and water therefrom, and also connected with the generator, and a pump connected in the return-pipe, arranged to move the contents of the return-pipe to the generator, and the forcing action of which is aided by the pressure in that part of the return-pipe which delivers thereto.

3. The combination, with a steam-generator and a steam-supply pipe leading from the generator to an engine or other steam-using device, of a separator connected to the steam-pipe, a return-pipe so connected with the steam-pipe as to take both steam and water therefrom, and also connected with the generator, and a pump connected in the return-pipe and arranged to move the contents of the return-pipe to the generator.

4. The combination, with a steam-generator and a steam-pipe leading therefrom to a point below the water-level of the generator, of a return-pipe so connected with the steam-pipe at such low point as to take both steam and water therefrom, and a pump connected in the return-pipe, said pump being located above the receiving end of the return-pipe, and the portion of the return-pipe which ascends from the steam-pipe to the pump being extended to a point above the pump and connected with the latter through a descending leg, substantially as described.

In testimony that I claim the foregoing as my invention I affix my signature in presence of two witnesses.

WALTER BURNHAM.

Witnesses:
M. E. DAYTON,
TAYLOR E. BROWN.